United States Patent [19]
Schmidt

[11] Patent Number: 5,881,588
[45] Date of Patent: Mar. 16, 1999

[54] SECURITY LOCK

[75] Inventor: Reinhold Schmidt, Mengen, Germany

[73] Assignee: Altenloh, Brinck & Co. GmbH & Co. KG, Germany

[21] Appl. No.: 682,528

[22] PCT Filed: Jan. 5, 1995

[86] PCT No.: PCT/EP95/00039

§ 371 Date: Oct. 16, 1997

§ 102(e) Date: Oct. 16, 1997

[87] PCT Pub. No.: WO95/20086

PCT Pub. Date: Jul. 27, 1995

[30] Foreign Application Priority Data

Jan. 21, 1994 [DE] Germany .......................... 9400978 U

[51] Int. Cl.[6] .................................................. E05B 37/12
[52] U.S. Cl. ................................ 78/213; 70/304; 70/312
[58] Field of Search ........................... 70/23, 213, 219, 70/301, 304–306, 308, 312, 326, 328

[56] References Cited

U.S. PATENT DOCUMENTS

| | | | |
|---|---|---|---|
| 1,327,406 | 1/1920 | Racow | 70/306 |
| 1,347,708 | 7/1920 | Ponting et al. | |
| 1,994,240 | 3/1935 | Bennett | 70/304 |
| 2,032,821 | 3/1936 | Waits | |
| 4,499,745 | 2/1985 | Ricouard et al. | 70/312 X |

FOREIGN PATENT DOCUMENTS

| | | | |
|---|---|---|---|
| 0360125 | 3/1990 | European Pat. Off. | |
| 807099 | 1/1937 | France | 70/304 |
| 874061 | 7/1942 | France | |
| 58644 | 9/1891 | Germany | 70/304 |
| 237703 | 8/1911 | Germany | 70/304 |
| 344982 | 12/1921 | Germany | 70/304 |
| 2501554 | 7/1976 | Germany | 70/304 |
| 1227786 | 4/1986 | U.S.S.R. | 70/312 |
| 227703 | 1/1925 | United Kingdom | 70/304 |

*Primary Examiner*—Lloyd A. Gall
*Attorney, Agent, or Firm*—Jones & Askew

[57] ABSTRACT

The present invention relates to a security lock comprising a socket and a locking component which can be inserted into and secured to the socket, in which the locking component has at least one locking cam rotatable to engage behind a bearing surface in the socket in its locked position. At least two staggered pins have a locking cam at their end region inside the socket, which pins are parallel to the longitudinal axis of the locking component. The upper ends of the pins have a handle which are accessible outside of the locking component.

10 Claims, 3 Drawing Sheets

SECURITY LOCK

The present invention pertains to a safety lock that consists of a socket and a locking component that can be inserted in and connected to the socket, with the locking component comprising at least one detent cam that can be turned by means of an implement that is inserted into the locking component, and with the detent cam engaging into a contact surface in the socket in its locked position.

Safety locks of this type are generally known. In such safety locks, the most frequently used implement is a key. However, it was determined that these known safety locks do not provide a sufficient theft deterrent because they can be opened relatively easily by means of special tools or duplicate keys. Replacing the key/lock mechanism with combination locks is also known. However, these combination locks do not represent a significant obstacle for correspondingly trained specialists.

The present invention is based on the objective of improving a known safety lock in such a way that a practically absolute theft deterrent is attained. Although it is impossible to open the lock forcefully, the safety lock can be opened by the user with relatively simple means.

According to the invention, this objective is attained by the arrangement of least two rotatable, offset pins in the locking component such that they extend parallel to its longitudinal axis X—X, that one respective detent cam is arranged on the end regions of the aforementioned pins which are situated inside of the socket, and that the upper end of the pins which is accessible from the outside comprises an implement attachment part. Due to the design according to the invention, the locking component in particular can be constructed in solid form massive, because only the bores for the pins and the corresponding recesses for the detent cams need to be arranged in the locking component. Consequently, the safety lock is largely protected from mechanical damage. In order to release the safety lock, the detent cams must be turned to a very precise position via the implement attached to the pins so as to disengage the detent cams from the contact surface. The locking component can only be displaced inside of the socket or removed from the socket in this particular position. Since there exist almost arbitrary combinations of the detent cam positions, it is practically impossible to locate the release position. However, the locking component can be turned inside of the socket in any position of the pins or the detent cams, so that it is impossible to transfer a torque, e.g., for forcibly opening the lock.

The invention is described in detail below with reference to the embodiments illustrated in the enclosed figures.

DETAILED DESCRIPTION OF THE PREFERRED EMBODIMENT

Figure 1:
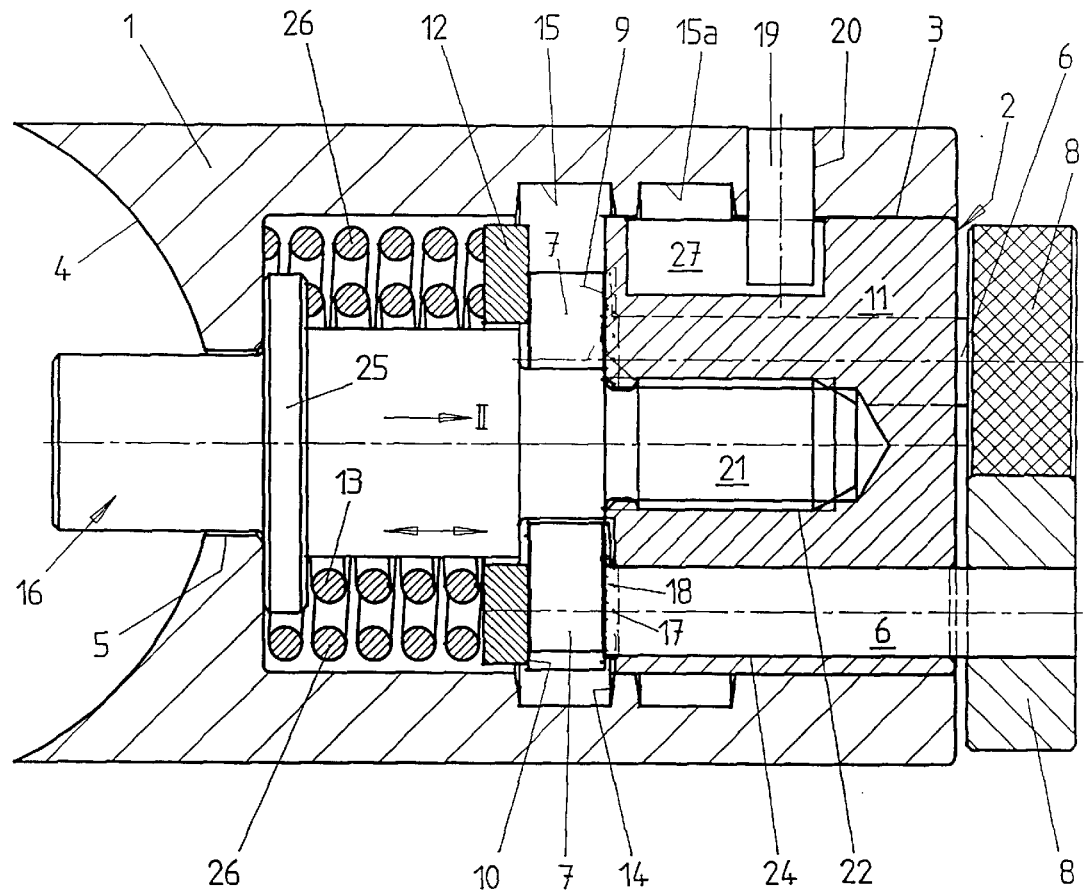
FIG. 1, a longitudinal section through a safety lock according to the invention.

FIG. 1 shows a safety lock according to the invention. This safety lock consists of a socket 1 and a locking component 2 that can be inserted in and connected to the socket 1. In the embodiment shown, the socket 1 essentially has the shape of a hollow cylinder and comprises an opening 3 for inserting the locking component 2 on one end and a base 4 that, in particular, is constructed in concave fashion and provided with a central through-opening 5 on its other end. The safety lock shown may, for example, be used as a safety lock for the handlebar of a bicycle. In this case, the socket 1 of the safety lock is welded laterally onto the side of the frame part that accommodates the handlebar of the bicycle. The curvature of the concave base 4 is adapted to the circumference of the frame part that accommodates the handlebar. At least two, preferably three, rotatable pins 6 that are arranged offset to one another extend inside of the locking component 2 parallel to its longitudinal axis X—X. The pins 6 are preferably arranged on a circle around the longitudinal axis X—X. Detent cams 7 are arranged on the end regions of the pins 6 which are situated inside of the locking component 2. An implement attachment part 8 is arranged on the ends of the pins which are accessible from the outside. The detent cams 7 are respectively guided inside of the locking component 2 between two guide surfaces 9, 10, with the locking component 2 consisting of two parts, namely a guide part 11 for the pins 6 and an annular, disk-shaped end part 12. Each of the two components 11, 12 respectively comprises one of the guide surfaces 9, 10. In the embodiment shown, a compression spring 13 acts upon the disk-shaped end part 12, namely its side that is situated opposite to the guide surface 10. The other end of the compression spring is supported on an annular collar 25 arranged on a safety bolt 16 of the locking component 2. Consequently, the end part 12 is pressed against the detent cams 7 by the compression spring 13. In the locked position of the safety lock according to the invention, the detent cams 7 engage into a contact surface 14 inside of the socket 1 if they are situated in the corresponding rotational position. This contact surface 14 is advantageously formed by an interior groove 15 arranged in the wall of the socket 1. The height of this interior groove 15 is larger than/equal to the thickness of the detent cams 7. However, the height of the groove is preferably larger than the thickness of the detent cams 7. The detent cams 7 advantageously have the circumferential shape of an irregular polygon with arc-shaped sides. The dimensions of these sides are chosen such that the detent cams 7 engage into the contact surface 14 of the interior groove 15 within one rotational range and release the contact surface 14 within the other rotational range.

This figure also shows that the safety bolt 16 is centrally fastened in the locking component 2, e.g., via a threaded extension that extends through the through-opening 5 in the base 4 and projects from the through-opening 5 in the locked position shown. In this particular position, the safety bolt 16 protrudes into a bore in the handlebar if the safety lock according to the invention is locked, i.e., the handlebar can no longer be turned relative to the frame part. An additional compression spring 26 that is supported on the base 4 on one end and the end part 12 on the other end is arranged around the compression spring 13. However, the spring force of this compression spring 26 is weaker than that of the compression spring 13, i.e., the compression spring 13 cannot be compressed by the compression spring 26. The compression spring 26 serves for moving the locking component 2 axially outward from its locked position.

Catch depressions 17 are arranged in the guide surfaces 9, i.e., the inner end face of the component 11, concentric to the longitudinal axis Y—Y of the pins, with a catch element 18 arranged on the surface of the detent cam 7 engaging into one of the catch depressions 17. In the embodiment shown, the catch element 18 consists of a protuberance that, if viewed in the form of a longitudinal section, has a triangular shape, with the catch depressions 17 arranged on the guide surface 9 having a shape that is adapted to the triangular protuberance. Due to this design, the detent cams 7 and the pins 6 guided in the locking component 2 are collectively raised if the pins are turned out of the position in which the protuberance engages into one of the catch depressions 17, i.e., the cam is released from the contact surface 14.

A limit stop bolt 19 is arranged in the interior wall of the socket 1 in such a way that its inner end section protrudes into an axial recess 27 of the locking component 2. The limit stop bolt 19 is pressed into a bore 20 of the socket 1 as soon as the locking component 2 is inserted into the socket 1. The limit stop bolt 19 limits the displacement of the locking component 2 inside of the socket 1 between the locked position shown, in which the detent cams 7 are able to engage into the interior groove 15, and the release position of the safety lock. In this case, the locking component 2 is displaced such that it adjoins the limit stop bolt 19 under the influence of the compression spring 26. This figure also shows that the locking component 2 is situated in the socket 1 approximately flush with the socket 1 in the locked position. The implement attachment part 8 consists of a rotary wheel that can be turned manually without requiring a special key.

The safety lock according to the invention is assembled as follows. Initially, the pins 6 are inserted into the guide part 11 until the detent cams 7 respectively adjoin the guide surface 9 of the guide part 11. Subsequently, the compression spring 13 and then the annular end part 12 are pushed over the safety bolt 16, with the threaded pin 21 arranged on one end of the end part subsequently being screwed into a threaded bore 22 of the guide part 11 such that the detent cams 7 and the pins 6 are secured in their position and cannot fall out of the guide part 11. Finally, the compression spring 26 is placed over the safety bolt 16 so as to make contact with the end part 12. The unit preassembled in this way is now inserted into the socket 1 through the insertion opening 3 until the compression spring 26 adjoins the base 4. Subsequently, the limit stop bolt 19 that prevents the removal of the locking component 2 from the socket 1 is inserted into the bore 20. The compression spring 26 preferably has such dimensions that the locking component 2 is pressed against the limit stop bolt 19 under the influence of the compression spring 26 after the assembly. The length of the safety bolt 16 is chosen such that the safety bolt 16 does not protrude beyond the base 4 in the position in which the locking component 2 is in contact with the limit stop bolt 19, but rather situated inside of the through-opening 5 with its end. The diameter of the through-opening 5 and the diameter of the safety bolt 16 are adapted to one another in such a way that only a minute play exists between the wall of the through-opening 5 and the circumference of the safety bolt 16 in the locked position shown in FIG. 1. Consequently, the safety bolt 16 already adjoins the base 4 during the slightest excursion resulting from a forceful deformation of the safety bolt, i.e., an additional bending of the safety bolt is prevented. When inserting the locking component 2 into the socket 1, the detent cams 7 are turned via the pins 6 in such a way that the detent cams 7 do not project beyond the circumference of the locking component 2, but rather such that their entire circumferential region is either situated flush with the circumferential region of the locking component 2 or is set back from the circumferential region of the locking component. In order to secure the safety lock, the locking component 2 is manually pushed into the socket 1 against the force of the compression spring 26. In this case, the displacement is limited by the annular collar 25 in such a way that the detent cams 7 diametrically oppose the interior groove 15 if the locking component 2 is displaced to its maximum. In this position, the detent cams 7 can be turned via the pins 6 by using the implement attachment part 8, such that the detent cam engages into the contact surface 14 with one circumferential region, i.e., the locking component 2 is locked in the socket 1 and the safety bolt 16 is secured in its locked position. At this point, an axial displacement of the locking component 2 is no longer possible. In order to locate the release position of the detent cams 7 in which the detent cams lie inside of the circumferential surface of the locking component 2 with their entire cam region, an identification in the form of a coding can be provided. For this purpose, two markings can be provided, namely one on the implement attachment part 8 and one on the circumference of the bore 24 that accommodates the respective pin 6. In this case, the markings are arranged relative to one another and relative to the contour of the assigned detent cam 7 in such a way that, originating from that particular position in which the two markings coincide, a certain angular range is provided, around which the pin 6 with the implement attachment part 8 must be turned, e.g., in the clockwise direction, for attaining the release position of the respective detent cam 7. This annular region is preferably determined by counting successive catch positions. These catch positions are defined by the previously described catch depressions 17, into which the respective protuberance engages. It is advantageous to provide ten catch depressions 17 in accordance with the numbers 0 through 9. Due to the fact that the marking on the implement attachment part 8 is arranged differently with respect to the contour of the circumferential surface of the respective detent cam 7 and each pin 6, namely by the distance of one catch increment, it is possible to adjust arbitrary codings. In the embodiment shown, three pins 6 are provided. However, the scope of the invention also includes embodiments in which a larger number of pins 6 with detent cams 7 are arranged in the locking component 2. The number of pins essentially depends on the number of desired combination options.

Figure 2:
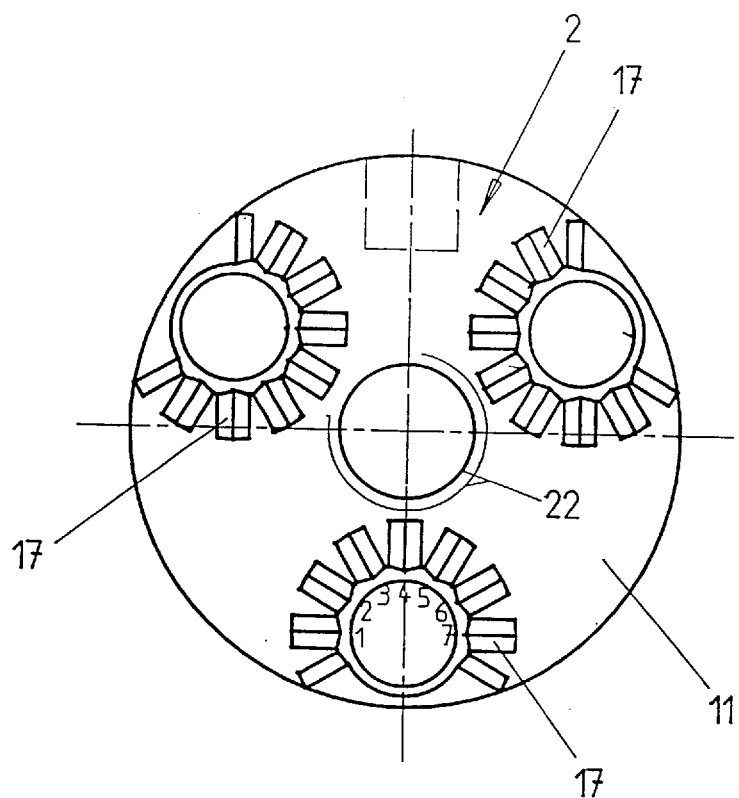
FIG. 2, a view of the locking component in the direction of the arrow II in FIG. 1, and FIG. 3, a longitudinal section through an additional embodiment of a safety lock according to the invention.

FIG. 2 shows an aspect of the inner end face of the locking component 2. This figure shows that seven catch depressions 17 are arranged concentrically around the opening of the bore 24, over an angular range of approximately 180°. In this case, an angular range of approximately 120° which comprises no catch depressions 17 is provided. This design makes it possible to count the respective combinations for the release position without requiring markings, because it is easily possible to determine the first as well as the following catch positions due to the large angular range without catch depressions, e.g., by turning the unit in the clockwise direction.

Figure 3:
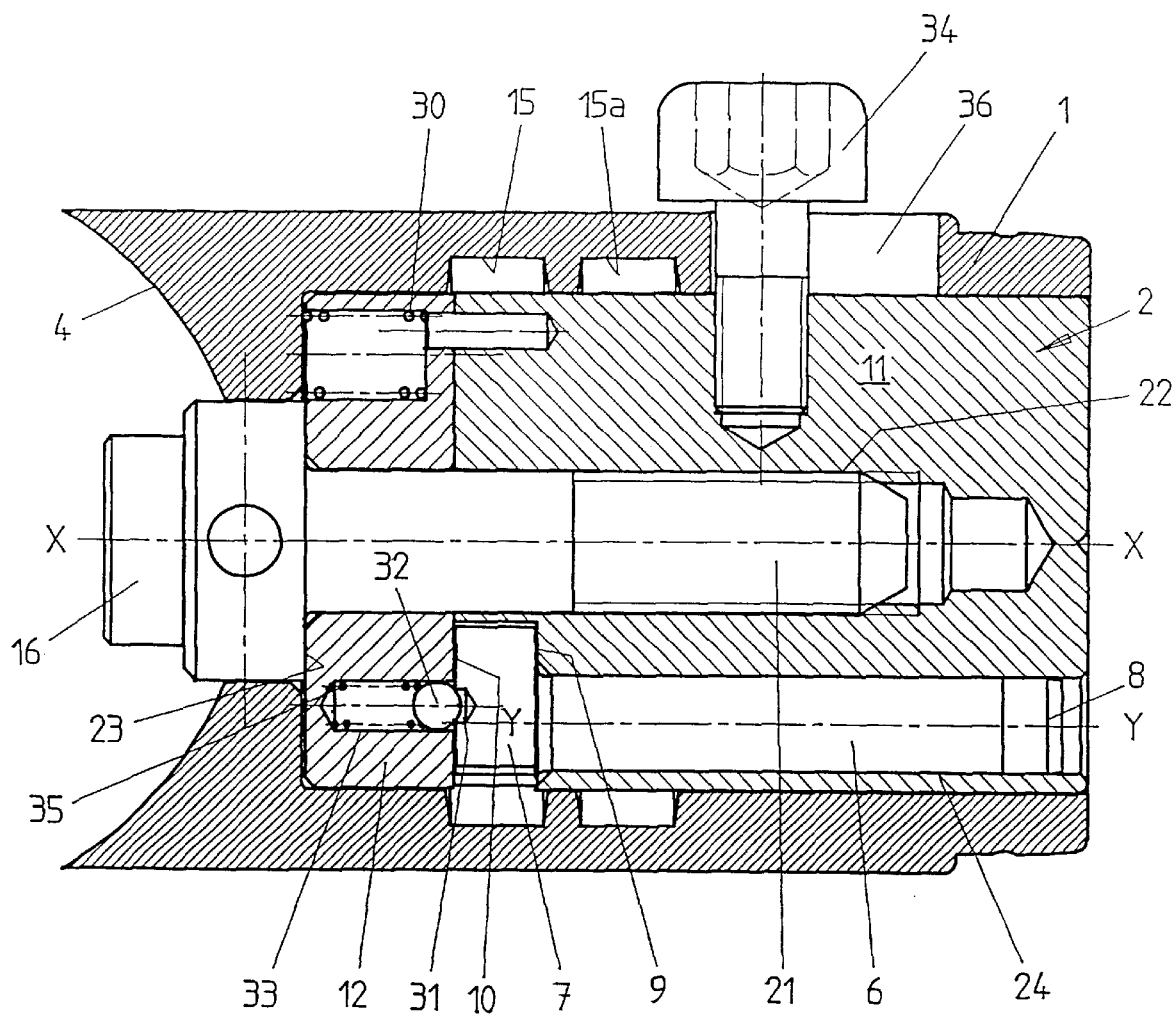

FIG. 3 shows one additional embodiment of a safety lock according to the invention. In this figure, identical components are idenified by the same reference numerals as in FIG. 1. The essential difference with respect to the embodiment according to FIG. 1 can be seen in the fact that the detent cams 7 are guided between the guide surfaces 9,10 of the guide part 11 and the end part 12 with practically no axial play. In this case, a central compression spring 13 is not provided. However, a compression spring 30 is eccentrically arranged on the end part 12 between the end part and the base 4. The individual catch positions of the detent cams 7 are attained due to the fact that dome-shaped depressions 31, into which a ball 32 arranged in the end part 12 engages, are arranged in the surface of the detent cam 7 which is assigned to the end part 12. These depressions are arranged concentric to the rotational axis of the pins 6. The aforementioned ball is arranged inside of a bore 33 of the end part 12 and spring-loaded via a compression spring 35 that lies inside of the bore 33 in the end part 12. In the embodiment shown, two interior grooves 15, 15*a* are arranged inside of the socket 1, with the interior groove 15 corresponding with the locked position of the locking component 2 and the interior groove 15*a* corresponding to the release position. The locking component 2 can be either locked or released in both positions which correspond to the grooves 15, 15*a*, namely by turning the detent cams 7. An implement 34 that protrudes radially from the locking component 2 and can be displaced inside of an oblong hole 36 in the socket 1 is provided for displacing the locking component 2 inside of the socket 1. In this case, the oblong hole 36 may comprise a circumferentially extending section such that the locking component 2 can be easily turned in its release position, with the implement 34 ultimately being situated inside of the circumferentially extending section of the oblong hole 36 such that the lock is fixed in the release position.

In an additional embodiment of the safety lock according to the invention, the socket 1 is realized with a closed base 4 such that a space is formed between the locking component 2 and the base 4. This space serves for safely storing certain objects. In this case, the safety bolt 16 is eliminated such that a safe is formed with the safety lock according to the invention.

The individual components of the safety lock according to the invention consist of high-strength materials, e.g., steel. This prevents the demolition of the safety lock according to the invention with simple hand tools.

The invention is not limited to the embodiments shown. On the contrary, the scope of the invention also includes embodiments in which constructive characteristics disclosed in the individual embodiments are combined. It is, for example, possible that the socket does not represent a separate component, but rather the wall of the part to be secured.

I claim:

1. Safety lock, comprising a socket and a locking component that can be inserted in and connected to the socket, with the locking component comprising at least one detent cam that can be turned by means of an implement that is inserted into the locking component, and with the detent cam engaging into a contact surface in the socket in its locked position, characterized by the fact that at least two rotatable, offset pins (6) are arranged in the locking component (2) such that they extend parallel to its longitudinal axis X—X, that one respective detent cam (7) is arranged on the end regions of the pins which are situated in the socket (1), that the upper ends of the pins (6) which are situated in the locking component (2) and accessible from the outside comprise an implement attachment part (8), that the detent cams (7) are guided inside of the locking component (2) between two guide surfaces (9, 10), that the locking component (2) is comprised of two parts, namely a guide part (11) for the pins (6) and an end part (12), with each of the two parts (11, 12) respectively comprising one of the guide surfaces (9, 10), that a compression spring (26, 30) acts upon the side of the end part (12) which is situated opposite to a guide surface (10), and that the detent cams (7) have a circumferential shape with the dimensions being chosen such that the detent cams (7) only engage into the contact surface (14) of the socket (1) within one rotational range of the detent cams, and with the detent cams (7) extending flush with the circumference of the locking component (2) or lying inside of the locking component (2) within the other rotational range of the detent cams (7).

2. Safety lock according to claim 1, characterized by the fact that the end part (12) is held between the detent cams (7) and a compression spring (13), with one end of the compression spring (13) being supported on an abutment arranged on a base (4) of the locking component, and with the abutment being formed by an annular collar (25) arranged on a safety bolt (16) of the locking component (2).

3. Safety lock according to claim 1, characterized by the fact that the end part (12) is held between a base (4) of the socket (1) and the detent cams (7).

4. Safety lock according to claim 1, characterized by the fact that the contact surface (14) of the socket (1) is formed by an interior groove (15) arranged in a wall of the socket, with the height of the groove being larger than or equal to the thickness of the detent cams (7).

5. Safety lock according to claim 1, characterized by the fact that catch depressions (17) are arranged concentric to the longitudinal axis of the pins (6) in one of the end faces of the locking component (2) which face the guide surfaces (9, 10), with one respective catch element (18) of the detent cams being able to engage into one of the catch depressions (17), depending on the rotational position of the detent cams (7).

6. Safety lock according to claim 5, characterized by the fact that the catch elements (18) arranged on the cams comprise a protuberance that has a triangular shape, and that the respective catch depressions (17) have a cross-sectional shape that is adapted to the protuberance.

7. Safety lock according to claim 1, characterized by spring-loaded balls (32) that are arranged in a guide surface, with the balls engaging into dome-shaped catch depressions (31) that are adapted to the shape of the balls and arranged in the cams.

8. Safety lock according to claim 1, characterized by the fact that a safety bolt (16) is arranged centrally in the locking component (2), with the safety bolt extending through the locking component (2) and a through-opening (5) in a base (4) of the socket (1), and with the safety bolt protruding from the through-opening (5) in the locked position of the locking component (2).

9. Safety lock according to claim 1, characterized by the fact that a limit stop bolt (19) that can be inserted, specifically, pressed, into a radial bore (20) is arranged in an interior wall of the socket (1), with the limit stop bolt engaging into an axial recess (27) of the locking component (2).

10. Safety lock according to claim 1, characterized by the fact that the socket (1), the locking component (2) and the pins (6) consist of high-strength materials, specifically, steel.

\* \* \* \* \*